(12) United States Patent
Fedotov et al.

(10) Patent No.: US 7,670,054 B2
(45) Date of Patent: Mar. 2, 2010

(54) BEARING

(75) Inventors: Alexander Fedotov, London (GB); Ismail Scheryar Zafar Jalisi, London (GB)

(73) Assignee: Xerox Corporation, Norwalk, CT (US)

( * ) Notice: Subject to any disclaimer, the term of this patent is extended or adjusted under 35 U.S.C. 154(b) by 672 days.

(21) Appl. No.: 11/640,687

(22) Filed: Dec. 18, 2006

(65) Prior Publication Data

US 2008/0144983 A1 Jun. 19, 2008

(51) Int. Cl.
*F16C 23/04* (2006.01)
(52) U.S. Cl. .................................. 384/202; 384/192
(58) Field of Classification Search .............. 384/192, 384/202, 215, 220–222, 276
See application file for complete search history.

(56) References Cited

U.S. PATENT DOCUMENTS

| | | | | |
|---|---|---|---|---|
| 1,825,239 A | * | 9/1931 | Meyer | 384/202 |
| 1,989,957 A | * | 2/1935 | Walters | 384/418 |
| 2,730,222 A | * | 1/1956 | Klein | 384/418 |
| 3,018,146 A | * | 1/1962 | Euwe et al. | 384/299 |
| 3,859,885 A | * | 1/1975 | Hayashida | 84/251 |
| 4,134,175 A | | 1/1979 | Contoyanis | |
| 4,804,277 A | | 2/1989 | Counoupas | |
| 5,457,520 A | | 10/1995 | Schell et al. | |
| 5,511,885 A | | 4/1996 | Coleman | |
| 5,538,475 A | | 7/1996 | Jaskowiak | |
| 5,632,684 A | | 5/1997 | Kumar et al. | |
| 6,024,497 A | | 2/2000 | Leibman | |
| 6,467,965 B1 | | 10/2002 | Wyer | |
| 6,474,639 B1 | | 11/2002 | Borne et al. | |
| 6,530,692 B2 | | 3/2003 | Wyer | |
| 6,975,822 B2 | | 12/2005 | Kunou et al. | |

* cited by examiner

*Primary Examiner*—Thomas R Hannon
(74) *Attorney, Agent, or Firm*—Fay Sharpe LLP; Karl W. Hauber (57) ABSTRACT

A bearing is provided comprising an elongated body including an outer surface and an inner bore. The body includes a front face and a rear face. The front face has at least one circumferential groove and the rear face has at least one circumferential groove. The inner bore and the front face groove define a first wall having a thickness. The front face groove and the rear face groove define a second wall having a thickness. The rear face groove and the outer surface define a third wall having a thickness. The first wall, second wall, and third wall form a pair of crenulations therebetween wherein the first wall thickness is greater than the second wall thickness.

24 Claims, 5 Drawing Sheets

BEARING

BACKGROUND

The present disclosure relates to a bearing that fits and is removable and/or securable to a wall of a reproduction apparatus. The features of the present disclosure provide in embodiments a mounting system advantageously for use in most any apparatus which requires bearings, for example, electrophotographic printing machines.

Electrophotographic marking is a well-known, commonly used method of copying or printing documents. Electrophotographic marking is performed by exposing a charged photoreceptor with a light image representation of a desired document. The photoreceptor is discharged in response to that light image, creating an electrostatic latent image of the desired document on the photoreceptor's surface. Toner particles are then deposited onto that latent image, forming a toner image, which is then transferred onto a substrate, such as a sheet of paper. The transferred toner image is then fused to the substrate, usually using heat and/or pressure, thereby creating a permanent record of the original representation. The surface of the photoreceptor is then cleaned of residual developing material and recharged in preparation for the production of other images. Other marking technologies, for example, electrostatographic marking and ionography are also well-known.

An electrophotographic marking machine generally includes bearings for supporting and connecting parts, for example, auger shafts or developer paddles passing through the housing. The bearings should be able to avoid wear and to minimize resistance, while at the same time having the capacity to seal a hole in the housing which may have a large tolerance variation. As an example, an upper limit of the fit tolerance for a nominal diameter of 16 millimeters due to manufacturing conditions is 300 microns.

The bearings should also provide sealing capacity to prevent contamination of the machine with toner. Average dimension of some toner particles is on the magnitude of 6 microns. Other particles, for example, ferric particulates can be on the magnitude of 60 microns which can result in higher wear of moving parts due to abrasion by the component to the toner carrier material and shortening the lifespan of the developer.

To reduce failure rate and improve performance an extra operation of bonding bearings with adhesives was introduced. This increases the cost of manufacturing and also introduces risk factors associated with adhesives and the possibility of contamination of the inner surface of the bearing.

Other solutions, such as beam support circumferentially distributed around the bearing, are inappropriate for environments involving contaminants, as these require a full through hole to allow for large tolerances, thus allowing transport of contaminant across the bearing. Sealing one face only reduces the capacity of the bearing to deal with the large variation between the shaft and support hole and also limits the degree of dimensional variability with which it can accommodate.

It is therefore desirable to provide a bearing which can be utilized in a wall while still providing generally high durability, minimizing frictional resistance, and maximizing sealing capacity.

Reference is made to the following United States patents relating to reproduction machines and components such as bearings briefly summarized as follows:

U.S. Pat. No. 6,024,497 relates to a bushing mountable in a housing for supporting a rotating member and for providing a bias force to the rotating member. The bushing includes a body defining an aperture therein and a mounting member for mounting the bushing to the housing. The bushing also includes a biasing member operably associated with said body and said mounting member.

U.S. Pat. No. 5,632,684 relates to a shaft assembly and method of forming a shaft assembly having an elongated hollow shaft with a stepped portion on the surface of the shaft. The stepped portion of the shaft surface is formed of two straight edge sections joined by an inclined section. A gear having a corresponding straight/inclined edge configuration engages the shaft and contacts the shaft only on the corresponding straight edge portions.

U.S. Pat. No. 5,538,475 relates to a shaft assembly comprising an elongated member having at least a portion which is hollow, tubular, shell like having an inside surface defining a shaft core and an outside surface defining a shaft functional surface, the shaft core being filled with a hardened, moldable material, and the shaft functional surface having at least one functional feature thereon, which is of hardened, moldable material integrally molded with the hardened, moldable material in the shaft core. U.S. Pat. No. 5,511,885 relates to a plain flanged bearing or bushing for supporting a rotating shaft in a thin walled frame of an electrophotographic printing machine. The composite bearing has a flanged end and is adapted to be inserted in an opening in a thin walled support member until the flange abuts the surface of the wall. A protruding tab formed by displacing a small portion of the flange extends in an axial direction along the bearing and cooperates with a corresponding opening in the wall to prevent rotation of the bearing. A friction push nut or snap ring is attached to the bearing on the side of the wall opposite the flange. The protruding tab prevents the bearing from rotating about an axis which can cause the bearing to be worn on the exterior surface by rotational contact with the thin wall. A shaft to support idler rolls or other rotating elements is inserted in an inner bore of the bearing and is rotatably supported thereby.

U.S. Pat. No. 5,457,520 relates to a bearing for supporting a moving member on a support structure. The bearing includes a substantially U-shaped member having an internal periphery and an external periphery. The bearing also includes a first securer, associated with the internal periphery of the U-shaped member, for securing the moving member to the U-shaped member and a second securer, associated with the external periphery of the U-shaped member, for securing the U-shaped member to the support structure.

U.S. Pat. No. 4,804,277 relates to a bearing mounting system for mounting and retaining a rotatable shaft between first and second bearings mounted to first and second spaced frame members of a machine frame, utilizing commercially available bearings, with respective inner and outer races. Both bearings inner races are press fitted onto the shaft.

U.S. Pat. No. 4,134,175 relates to a non-rotating sleeve type bushing in which an eccentric flange integral with the bushing and projecting radially outwardly therefrom is so formed as to be received in a complementarily contoured flange recess in a bearing housing whereby rotation of the bushing with respect to the bearing housing is precluded by a positive mechanical locking action provided by the shear resistance of the flange member.

U.S. Pat. No. 6,467,965 relates to a bearing for use in reproduction machines that fits and is removable and/or securable to a wall of a reproduction apparatus. The bearing provides a snap-fit mounting feature.

All documents cited herein, including the foregoing, are incorporated herein by reference in their entireties.

SUMMARY

In accordance with one exemplary embodiment of the present disclosure, there is provided a bearing comprising an elongated body including an outer surface and an inner bore. The body includes a front face and a rear face. The front face has at least one circumferential groove and the rear face has at least one circumferential groove. The inner bore and the front face groove define a first wall having a thickness. The front face groove and the rear face groove define a second wall having a thickness. The rear face groove and the outer surface define a third wall having a thickness. The first wall, the second wall, and the third wall form a pair of crenulations therebetween. The first wall thickness is greater than the second wall thickness.

In accordance with another exemplary embodiment of the present disclosure, there is provided a bearing comprising an elongated body including an outer surface and an inner bore. The body has a front face and a rear face wherein at least one of the front face and the rear face having at least two circumferential grooves and the other of the front face and the rear face having at least one circumferential groove. The inner bore and a first front face groove define a first wall having a thickness. The first front face groove and a rear face groove define a second wall having a thickness. The rear face groove and a second front face groove define a third wall having a thickness. The second front face groove and the outer surface define a fourth wall having a thickness. The first wall, the second wall, the third wall, and the fourth wall form a plurality of crenulations therebetween. The first wall thickness is greater than the second wall thickness.

In accordance with another exemplary embodiment of the present disclosure, there is provided a bearing in an electrostatographic machine comprising an elongated body including an outer surface and an inner bore. The body has a front face and a rear face wherein the front face has at least one circumferential groove and the rear face has at least one circumferential groove. The front face groove having a width and the rear face groove having a width. The front face groove width tapers from the front face to the rear face.

DETAILED DESCRIPTION

While the principles of the present disclosure will be described in connection with an electrostatographic reproduction machine, it should be understood that the present disclosure is not limited to that embodiment or to that application. Therefore, it is should be understood that the principles of the present disclosure extend to all alternatives, modifications and equivalents as may be included within the spirit and scope of the appended claims.

The present disclosure relates to embodiments of a bearing for use in walls of reproduction machines. Although the bearing of the present disclosure is particularly well adapted for use in the illustrative printing machine, it will become evident that the bearing is equally well suited for use in a wide variety of machines and are not necessarily limited in its application to the particular embodiment shown herein.

Figure 7:
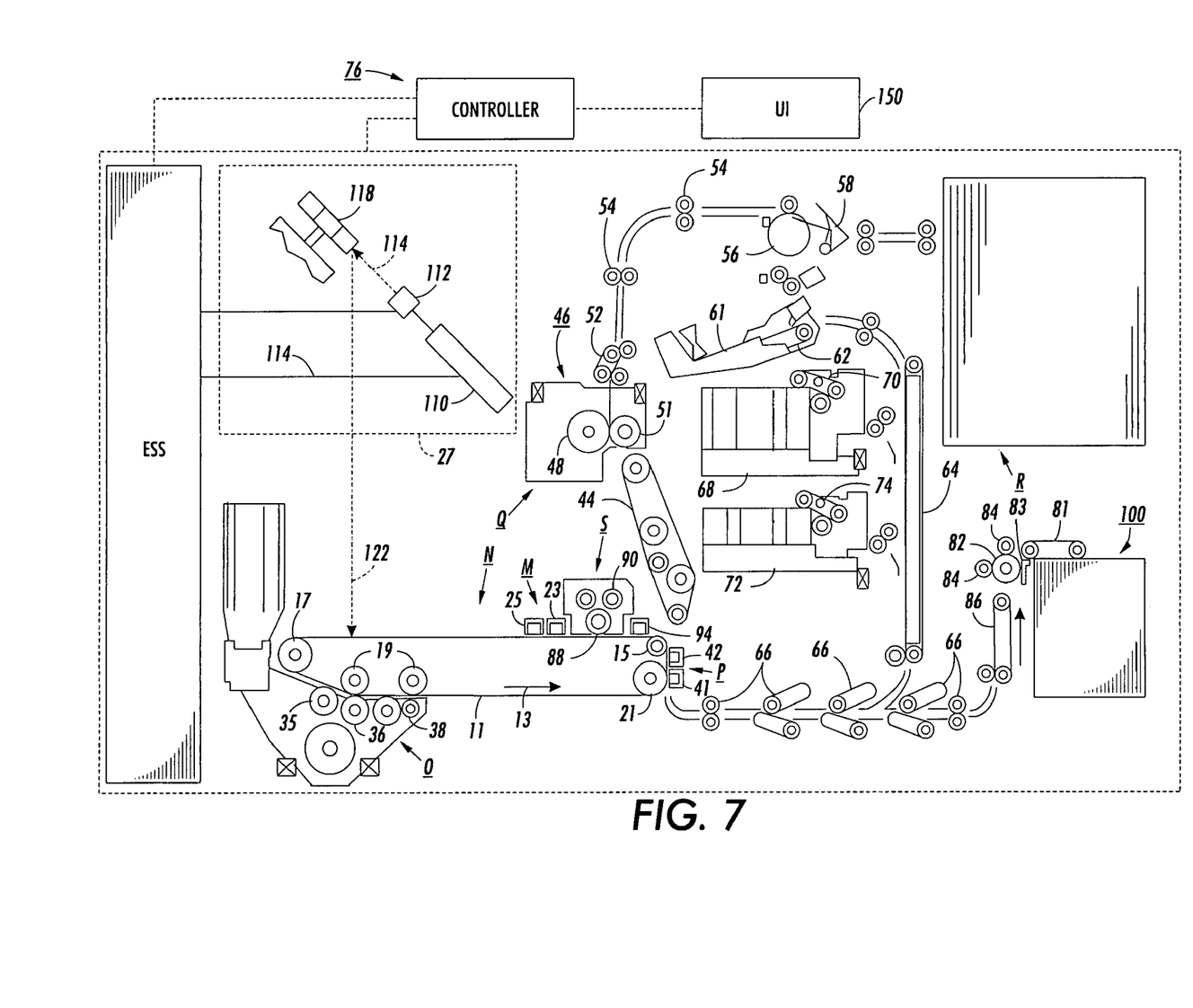

Referring to FIG. 7 of the drawings, an illustrative reproduction machine incorporating the bearing of the present disclosure is shown. The reproduction machine employs a photoconductive belt 11. Belt 11 moves in the direction of arrow 13 to advance successive portions sequentially through the various processing stations disposed about the path of movement thereof. Belt 11 is entrained about stripping roller 15, tensioning roller 17, idler roll 19 and drive roller 21. As roller 21 rotates, it advances belt 11 in the direction of arrow 13.

Initially, a portion of the photoconductive surface passes through charging station M. At charging station M, two corona generating devices indicated generally by the reference numerals 23 and 25 charge the photoconductive belt 11 to a relatively high, substantially uniform potential.

Next, the charged portion of the photoconductive surface is advanced through imaging station N. At the imaging station, an imaging module indicated generally by the reference numeral 27, records an electrostatic latent image on the photoconductive surface of the belt 11. Imaging module 27 includes a raster output scanner (ROS). The ROS lays out the electrostatic latent image in a series of horizontal scan lines with each line having a specified number of pixels per inch. Other types of imaging systems may also be used employing, for example, a pivoting or shiftable LED write bar or projection LCD (liquid crystal display) or other electro-optic display as the "write" source.

The imaging module 27 (ROS) includes a laser 110 for generating a collimated beam of monochromatic radiation 122, an electronic subsystem (ESS) associated with the machine electronic printing controller 76 transmits a set of signals via 114 corresponding to a series of pixels to the laser 110 and/or modulator 112, a modulator and beam shaping optics unit 112, which modulates the beam 122 in accordance with the image information received from the ESS, and a rotatable polygon 118 having mirror facets for sweep deflecting the beam 122 into raster scan lines which sequentially expose the surface of the belt 11 at imaging station N. A user interface (UI) 150 is associated with the controller 76.

Thereafter, belt 11 advances the electrostatic latent image recorded thereon to development station O. Development station O has three magnetic brush developer rolls indicated generally by the reference numerals 35, 36 and 38. A paddle wheel picks up developer material and delivers it to the developer rolls. When the developer material reaches rolls 35 and 36, it is magnetically split between the rolls with half of the developer material being delivered to each roll. Photoconductive belt 11 is partially wrapped about rolls 35 and 36 to form extended development zones. Developer roll 38 is a clean-up roll. The latent image attracts toner particles from the carrier granules of the developer material to form a toner powder image on the photoconductive surface of belt 11. Belt 11 then advances the toner powder image to transfer station P.

At transfer station P, a copy sheet is moved into contact with the toner powder image. First, photoconductive belt 11 is exposed to a pretransfer light from a lamp (not shown) to reduce the attraction between photoconductive belt 11 and the toner powder image. Next, a corona, generating device 41 charges the copy sheet to the proper magnitude and polarity so that the copy sheet is tacked to photoconductive belt 11 and the toner powder image is attracted from the photoconductive belt to the copy sheet. After transfer, corona generator 42 charges the copy sheet to the opposite polarity to detack the copy sheet from belt 11. Conveyor 44 then advances the copy sheet to fusing station Q.

Fusing station Q includes a fuser assembly 46 which permanently affixes the transferred toner powder image to the copy sheet. Preferably, fuser assembly 46 includes a heated fuser roller 48 and a pressure roller 51 with the powder image on the copy sheet contacting fuser roller 48. The pressure roller is cammed against the fuser roller to provide the necessary pressure to fix the toner powder image to the copy sheet. The fuser roll 48 is internally heated by a quartz lamp. Release agent, stored in a reservoir, is pumped to a metering roll. A trim blade trims off the excess release agent. The release agent transfers to a donor roll and then to the fuser roll.

After fusing, the copy sheets are fed through a decurler 52. Decurler 52 bends the copy sheet in one direction to put a known curl in the copy sheet and then bends it in the opposite direction to remove that curl.

Forwarding rollers 54 then advance the sheet to duplex turn roll 56. Duplex solenoid gate 58 guides the sheet to the finishing station R, or to duplex tray 61. At finishing station R, copy sheets are stacked in a compiler tray and attached to one another to form sets. When duplex solenoid gate 58 diverts the sheet into duplex tray 61. Duplex tray 61 provides an intermediate or buffer storage for those sheets that have been printed on one side and on which an image will be subsequently printed on the second, opposite side thereof, i.e., the sheets being duplexed. The sheets are stacked in duplex tray 61 facedown on top of one another in the order in which they are copied.

To complete duplex copying, the simplex sheets in tray 61 are fed, in seriatim, by bottom feeder 62 from tray 61 back to transfer station P via conveyor 64 and rollers 66 for transfer of the toner powder image to the opposed sides of the copy sheets. Inasmuch as successive bottom sheets are fed from duplex tray 61, the proper or clean side of the copy sheet is positioned in contact with belt 11 at transfer station P so that the toner powder image is transferred thereto. The duplex sheet is then fed through the same path as the simplex sheet to be advanced to finishing station R.

The high capacity variable sheet size sheet feeder 100 is the primary source of copy sheets. Feed belt 81 feeds successive uppermost sheets from the stack at nip 83 to a take-away drive roll 82 and idler rolls 84. The drive roll and idler rolls guide the sheet onto transport 86. Transport 86 advances the sheet to rolls 66 which, in turn, move the sheet to transfer station P.

Secondary tray 68 and auxiliary tray 72 are secondary sources of copy sheets. Copy sheets are fed to transfer station P from the secondary tray 68 or auxiliary tray 72. Sheet feeders 70, 74 are friction retard feeders utilizing feed belts and take-away rolls to advance successive copy sheets to transport 64 which advances the sheets to rolls 66 and then to transfer station P. The copy sheet is registered just prior to entering transfer station P so that the sheet is aligned to receive the developed image thereon.

Invariably, after the copy sheet is separated from the photoconductive belt 11, some residual particles remain adhering thereto. After transfer, photoconductive belt 11 passes beneath corona generating device 94 which charges the residual toner particles to the proper polarity. Thereafter, the pre-charge erase lamp (not shown), located inside photoconductive belt 11, discharges the photoconductive belt in preparation for the next charging cycle. Residual particles are removed from the photoconductive surface at cleaning station S. Cleaning station S includes an electrically biased cleaner brush 88 and two de-toning rolls 90.

The various machine functions are regulated by a controller 76. The controller 76 can be preferably a programmable microprocessor which controls all of the machine functions hereinbefore described. The controller provides a comparison count of the copy sheets, the number of documents being recirculated, the number of copy sheets selected by the operator, time delays, jam corrections, etc. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 1:
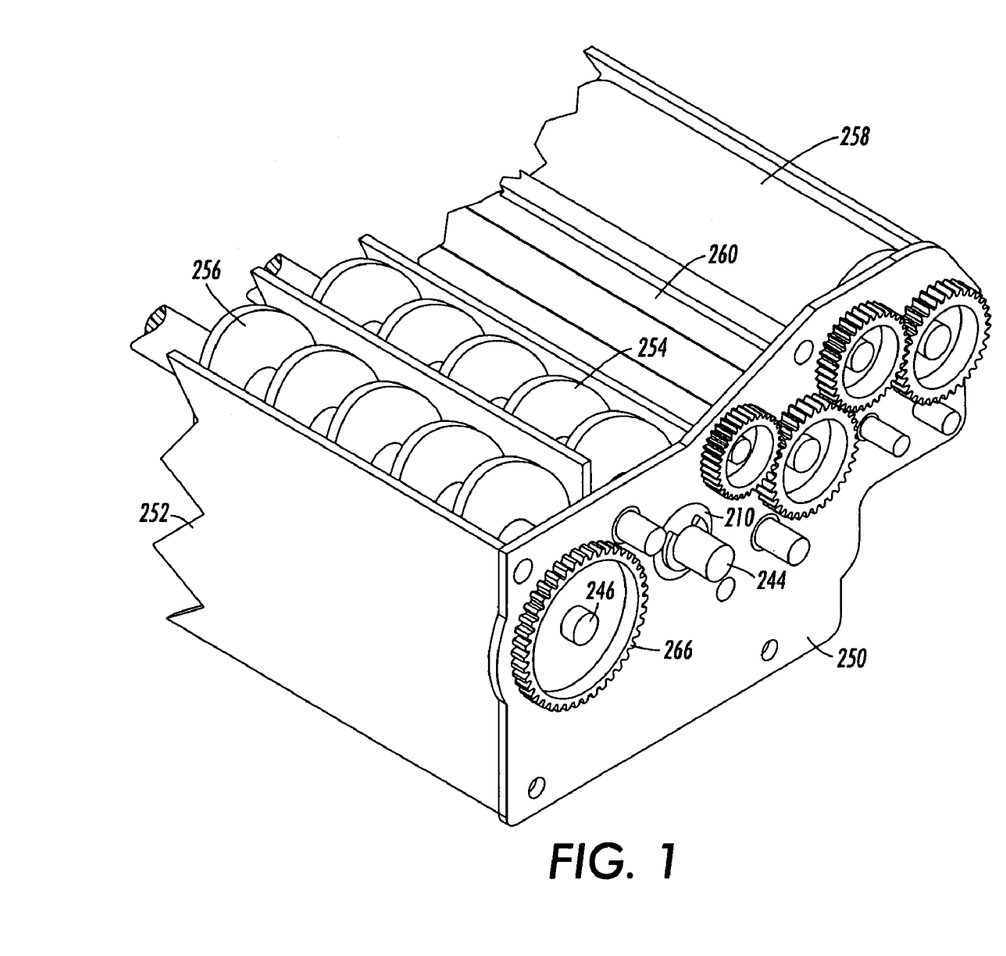
FIG. 1 illustrates a perspective view of a mounting system for an embodiment of the present disclosure.
Figure 2:
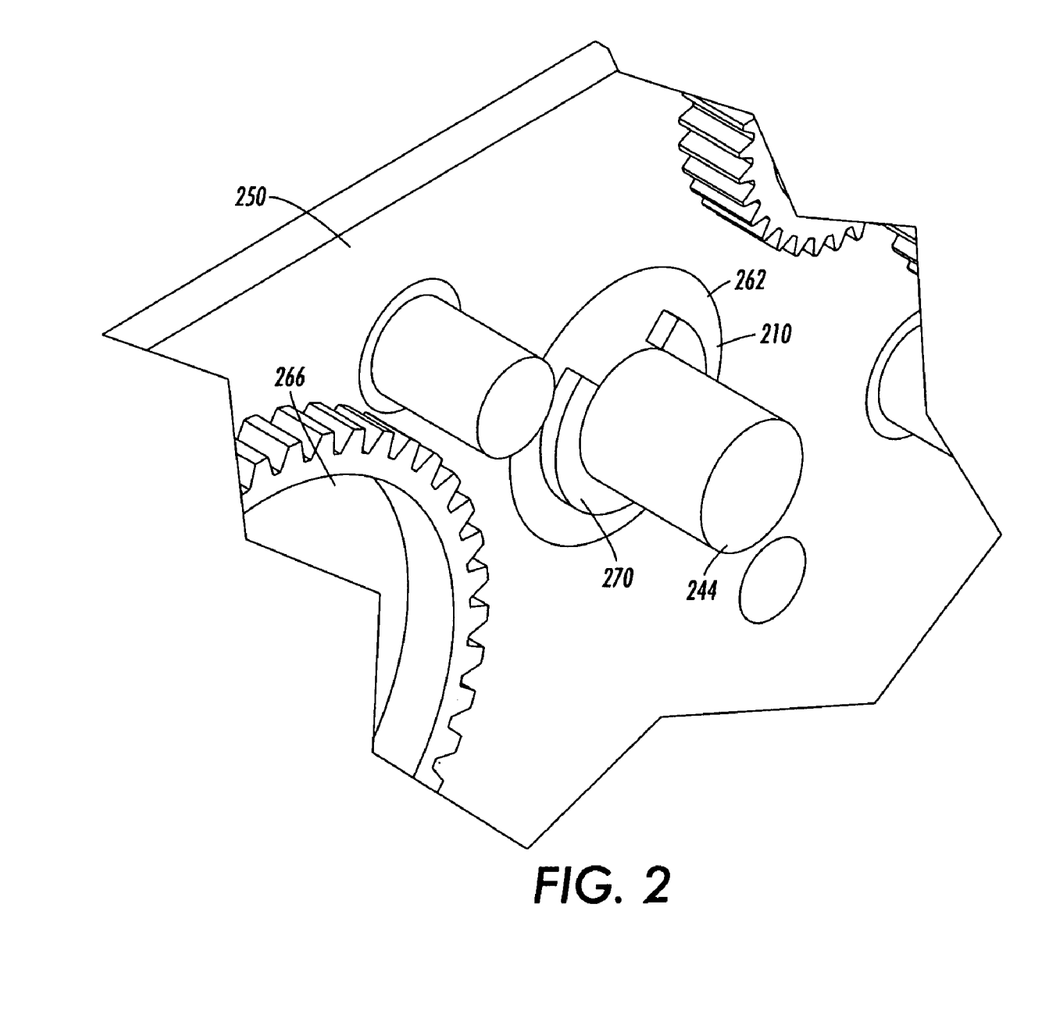
FIG. 2 illustrates an enlarged perspective view of the bearing of FIG. 1.

Turning now to FIGS. 1 and 2, illustrated are partial cutaway views from the FIG. 7 reproduction machine illustrating one of the bearings 210 of the present disclosure as it is installed in a housing wall 250. Also shown is a shaft 244 as it is installed into a shaft support portion of the bearing 210. The shaft support portion can have an inner bore 214 that is formed in a generally cylindrical shape to allow rotation of the shaft 244 therein.

FIG. 2 displays an enlarged view of the bearing 210 mounted in the housing 250. The assembly includes a base molding 252 and bearing support housing 250 associated therewith. A front and rear auger 254, 256 can be positioned inside the base molding 252. Shafts 244, 246, respectively, of the augers 254, 256 can be positioned in a bearing. The outer surface of the bearing can be supported in molded embossment of housing. A gear 266 can be mounted at the end of shaft 246. A similar gear can be located at the end of shaft 244 (not shown). The gear train inside the bearing housing transfers the motion from a magnet roll 258, which can be driven by an electrical motor from the opposite end, to a paddle 260 and augers 256, 254. The shafts can be restricted from axial movement with circlips 270. It is to be appreciated that the entire assembly can be enclosed by a cover (not shown), thereby prohibiting contamination of the machine with toner.

The bearing 210 can be inserted into a housing hole 262 and the shaft 244 then passes through the bearing 210, as shown in FIG. 2. To be described in more detail hereinafter, upon insertion, radial interference compresses the outer walls of the bearing, with the degree of compression decreasing towards the inner bore 214, which has minimal compression. The shaft 244, inserted through the inner bore 214, provides sliding fit with the bearing 210 and support of the shaft 244 through the housing wall 250. As the bearing 210 allows for large tolerance variation between its outer surface 216 and the hole 252 in the housing 250 without having any through cuts, it is able to perform in environments where sealing capacity is desired, such as developers.

The bearing 210 can be inserted into a housing hole 262 and the shaft 244 then passes through the bearing 210, as shown in FIG. 2. To be described in more detail hereinafter, upon insertion, radial interference compresses the outer walls of the bearing, with the degree of compression decreasing towards the inner bore 214, which has minimal compression. The shaft 244, inserted through the inner bore 214, provides sliding fit with the bearing 210 and support of the shaft 244 through the housing wall 250. As the bearing 210 allows for large tolerance variation between its outer surface 216 and the hole 262 in the housing 250 without having any through cuts, it is able to perform in environments where sealing capacity is desired, such as developers.

Figure 3:
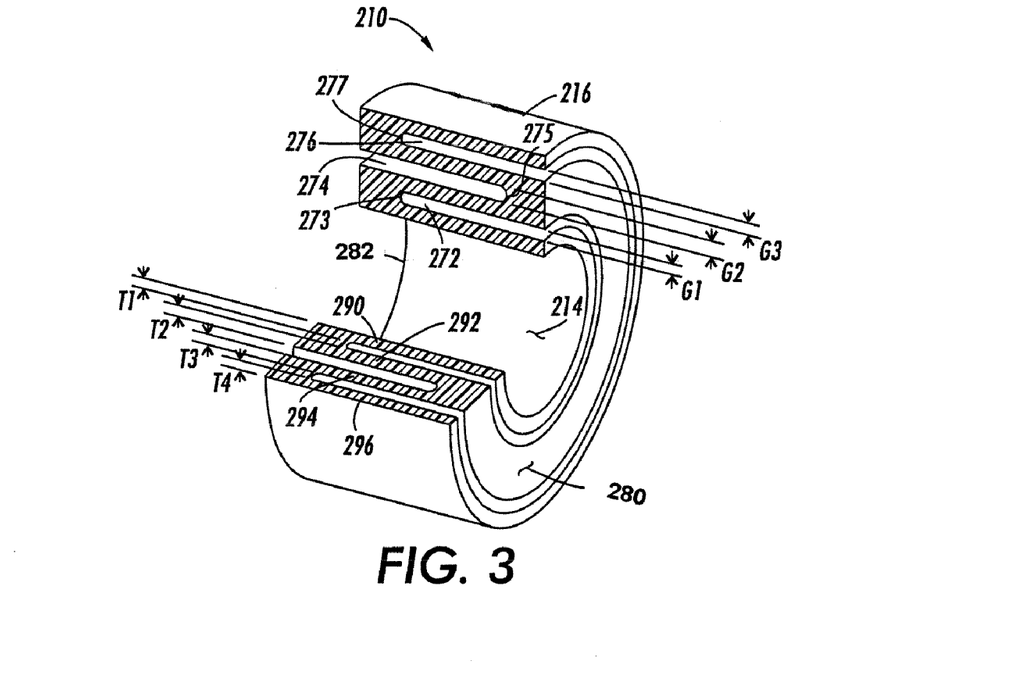
FIG. 3 illustrates a cross-sectional view of a first embodiment of the bearing.

Referring to FIG. 3, the bearing includes an outer surface 216, an inner bore 214, and front and rear faces 280, 282.

Circumferential grooves 272, 274, 276 can be provided on the front and rear faces. The number of grooves or cuts producing the crenulations can vary from a single cut upwards. The number of cuts can be generally dependent upon the dimensions of the bearing. Increasing the number of cuts increases the bearing radial flexibility. The cuts can be rounded in root areas 273, 275, 277 to reduce stresses and to prevent premature failure from crack propagation due to cyclic loading. The thickness of the outer shell wall 296 provides control over the flexibility of the bearing at its interface with the housing. The thickness of the inner bore wall maintains the rigid support of the shaft and including tighter tolerances of the interface between the shaft and the inner bore wall. The thickness of the intermediate wall, along with the number of cuts, controls the flexibility of the bearing and the degree of tolerance variation that can be accommodated. The bearing can be constructed from polyacetal filled with polytetrafluoroethylene, which allows dry bearing application. It is to be appreciated that other suitable materials for dry bearings can be used, such as IGLIDUR J®.

Another feature impacting the radial stiffness of the bearing 210 includes the groove width G. The grooves 272, 274, 276 have corresponding widths G1, G2, G3. In one variation, the groove width of the bearing can follow the pattern wherein G1<G2<G3, i.e. the groove width increases from G1 to G3. The increase can follow an arithmetic or geometric series. In assemblies where there is a large variation between the housing and the through shaft, another variation of the bearing can be supplied which provides compression of the bearing in the middle of the cross-section. In this arrangement, the bearing can follow another pattern, namely, G1<G2 and G2>G3 (not illustrated). This pattern supplies the greatest groove width to the middle section thereby providing a parabolic distribution of groove width. It is to be appreciated that the groove wall angle can be tapered to vary stiffness along the axis of the bearing 210. The taper can be arranged such that the groove narrows towards the blindside of the cut. The number of grooves can vary which provides for variable bearing stiffness and tolerance of housing location.

When bearing is fitted into housing, the outer cylindrical section, due to its reduced thickness, is easily compressed to accommodate higher dimensional variations. As the gradient of the groove width reduction decreases towards the inner bore, the latter is capable of accommodating an appropriate sliding fit with a shaft. As there are no extra axial holes to reduce radial stiffness, the sealing performance of the bearing is not compromised. When loads are applied to the shaft and transferred to the bearing due to the reduced stiffness of the outer circumference of the bearing contact pressure distribution between the bearing and the housing stays positive preventing particles to defeat the seal.

In operation, the bearing 210 is inserted into the wall 250 until an inside surface of the bearing contacts an inside surface 251 of the wall 250. A circlip 270 can be used to hold the bearing 210 substantially secured to the wall 250 thereby preventing axial movement. The spring action of the bearing 210 ensures high contact force between bearing 210 and housing 250 thereby reducing sliding and wear, while at the same time minimizing the increase in force between the bearing 210 and shaft 244.

The developer provides a mixture of toner and magnetic particles supplied from a supply bottle inside the cavity of the rear auger 256 through an opening in the top cover. The rear auger moves the mixture in axial direction and transfers it to the front auger. The front auger distributes the mixture alongside the paddle. The paddle supplies the mixture to the magnet roll. The latter then provides a photoreceptor with quantities of toner. During operation the bearings provide support to the augers and paddle shafts and can compensate for wide ranges of tolerances of the cylindrical holes in the molded embossments through deflections of the walls between the grooves. The bearings also serve as seals preventing contamination of the machine with toner.

The dimensions of the bearing are well suited for applications inside a reproduction machine although additional sizes and uses are envisioned. In one exemplary embodiment, an 8 mm shaft can be supported via the bearing in an 18 mm through hole, with one groove in both the front and the rear faces of the bearing, giving the first wall against which the shaft is held a thickness of 1.3 mm, a 0.8 mm groove, a second wall of 0.8 mm, a second groove of 0.8 mm and a third wall of 1.3 mm.

Figure 4:
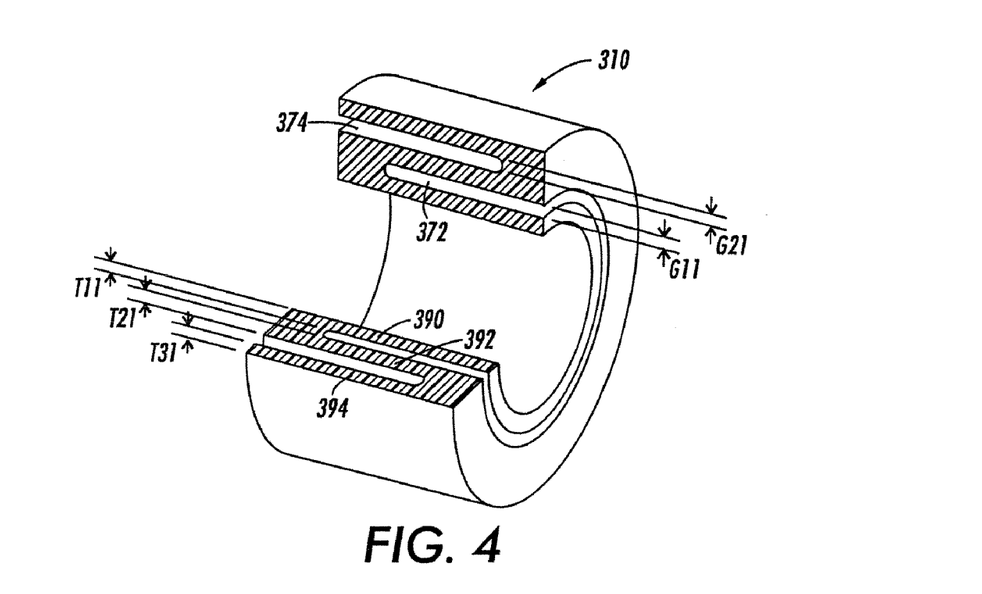
FIG. 4 illustrates a cross-sectional view of a second embodiment of the bearing.
Figure 5:
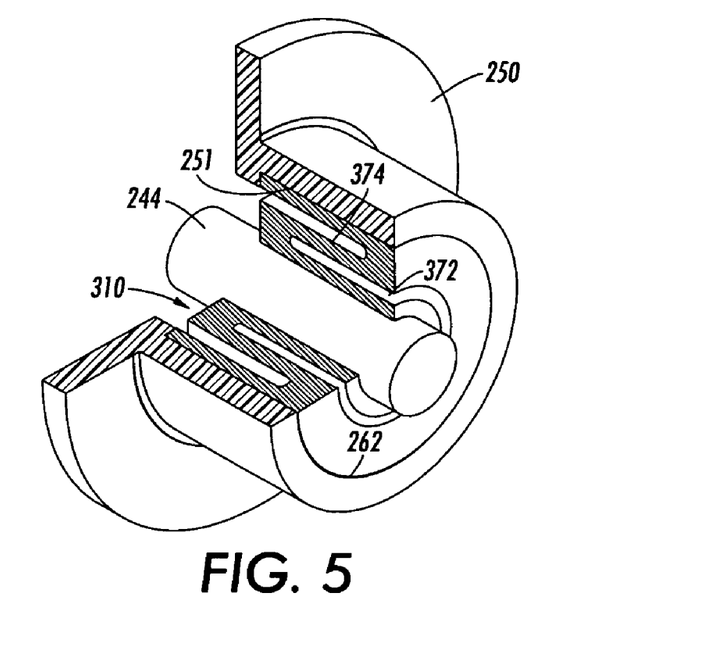
FIG. 5 illustrates a cross-sectional view of the bearing of FIG. 4 disposed in a wall along with a shaft disposed in the bearing.

FIGS. 4 and 5 illustrate cross-sectional views of a second embodiment of a bearing 310 disposed in wall 250. The bearing 310 is intended to support rotatable shaft 244 which may be used for idler rollers, drive rollers, belt rollers or any other shaft use within a reproduction machine. In FIG. 5, illustrated is a cross-sectional view of the bearing 310 of FIG. 4 disposed in wall 250. The bearing 310 can be removably securable to wall 250. Shaft 244 is installed into an end of bearing 310 and extends partially out the other end.

The bearing 310 can have a number of blind circular grooves sequenced from its outer side inward and from its inner side outwards. In the embodiment shown in FIGS. 4 and 5, bearing 310 has two grooves 372, 374, and three walls 390, 392, 394. The walls have corresponding thicknesses T11, T21, T31. The wall thickness T impacts the radial stiffness of the bearing 310. In one variation, the wall thicknesses of the bearing can follow the pattern wherein T11>T21>T31, i.e. the wall thickness decreases from T11 to T31. The decrease can follow an arithmetic or geometric series. In assemblies where there is a large variation between the housing 250 and the through shaft 244, another variation of the bearing can be supplied which provides compression of bearing 310 in the middle of the cross-section. In this arrangement, the bearing can follow another pattern, namely, T11>T21 and T21<T31 (not illustrated). This pattern supplies the lowest wall thickness to the middle section thereby providing a parabolic distribution of wall thicknesses.

Another feature impacting the radial stiffness of the bearing 310 includes the groove width G. The grooves 372, 374 have corresponding widths G11, G21. In one variation, the groove width of the bearing can follow the pattern wherein G11<G21, i.e. the groove width increases from G11 to G21. It is to be appreciated that the groove wall angle can be tapered to vary stiffness along the axis of the bearing 310. The taper can be arranged such that the groove narrows towards the blindside of the cut. Edge fillets (not illustrated) on the edges of the outer surface and inner bore can allow ease of fit of the bearing into the support wall and the shaft into the bearing.

Figure 6:
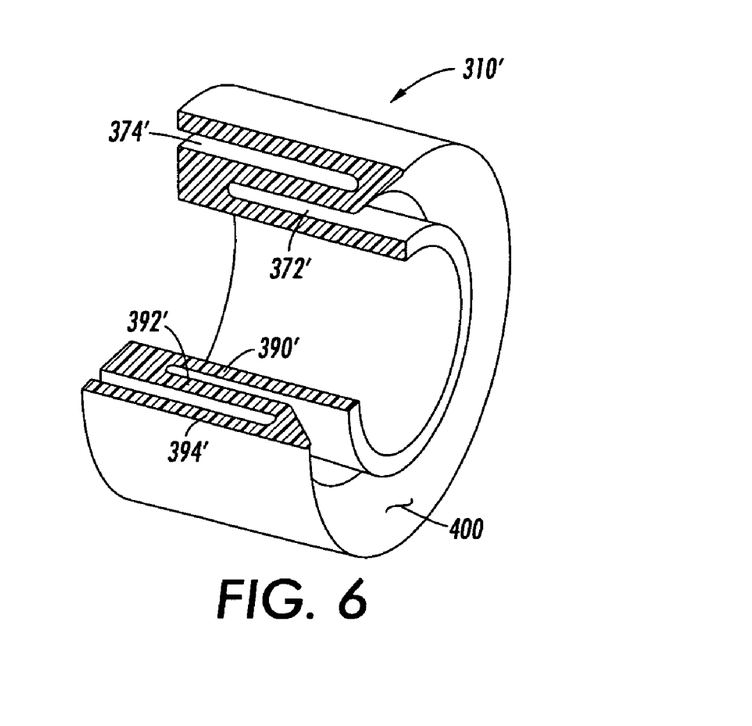
FIG. 6 illustrates a cross-sectional view of another variation of the second embodiment of the bearing; and, FIG. 7 is a schematic elevational view of an electrophotographic printing machine utilizing the present disclosure.

FIG. 6 illustrates another variation of the second embodiment of the bearing. Similar elements are referenced with like numbers including a suffix (') and new elements are referenced with new numbers. Bearing 310' can include chamfers, or angled walls 400 along the front and/or rear faces to provide greater flexibility as needed. Chamfering walls in roots of the grooves provide more even distribution of the radial stiffness alongside of the latter when the wall is going to be bent and twisted rather than simply compressed.

Other embodiments and features of the bearing are also envisioned. The bearing may be constructed of plastic including DELRIN® 500CL which is commercially available from DUPONT®. The bearing may include a plastic resin such as an Acetal resin. Other materials such as nylon may also be used so as to provide a generally low friction bearing surface for the rotation shaft. The inside surface of the bearing may have a coefficient of friction ranging from about 0.2 to about 0.3. The plastic may have hardness of about 1.3 ft-lb/in. The bearing can be made of one material using a generally simple molding process.

The bearings described herein can generally be easily mounted in a reproduction machine, can generally allow easier assembly, and can generally be replaced without the necessity of complex disassembly of many components.

While this disclosure has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

The invention claimed is:

1. A bearing comprising:
   an elongated body including an outer surface and an inner bore;
   said body having a front face and a rear face, said front face having at least one circumferential groove and said rear face having at least one circumferential groove;
   said inner bore and said front face groove defining a first wall having a thickness;
   said front face groove and said rear face groove defining a second wall having a thickness;
   said rear face groove and said outer surface defining a third wall having a thickness;
   said first wall, said second wall, and said third wall forming a pair of crenulations therebetween; and,
   said first wall thickness and said third wall thickness are both greater than said second wall thickness.

2. The bearing according to claim 1, wherein said second wall thickness is greater than said third wall thickness.

3. The bearing according to claim 1, wherein said outer surface includes an edge having a fillet therearound.

4. The bearing according to claim 3, wherein said inner bore includes an edge having a fillet therearound.

5. The bearing according to claim 4, wherein at least one of said outer surface edge and said inner bore edge includes a chamfer therearound.

6. A bearing comprising:
   an elongated body including an outer surface and an inner bore;
   said body having a front face and a rear face, at least one of said front face and said rear face having at least two circumferential grooves and the other of said front face and said rear face having at least one circumferential groove;
   said inner bore and a first front face groove defining a first wall having a thickness;
   said first front face groove and a rear face groove defining a second wall having a thickness;
   said rear face groove and a second front face groove defining a third wall having a thickness;
   said second front face groove and said outer surface defining a fourth wall having a thickness;
   said first wall, said second wall, said third wall, and said fourth wall forming a plurality of crenulations therebetween; and,
   said first wall thickness is greater than said second wall thickness.

7. The bearing according to claim 6, wherein said second wall thickness is greater than said third wall thickness.

8. The bearing according to claim 7, wherein said third wall thickness is greater than said fourth wall thickness.

9. The bearing according to claim 8, wherein said outer surface includes an edge having a fillet therearound.

10. The bearing according to claim 9, wherein said inner bore includes an edge having a fillet therearound.

11. The bearing according to claim 10, wherein at least one of said outer surface edge and said inner bore edge includes a chamfer therearound.

12. The bearing according to claim 6, wherein said second wall thickness is substantially the same as said third wall thickness.

13. The bearing according to claim 12, wherein said third wall thickness is less than said fourth wall thickness.

14. The bearing according to claim 6, wherein said first front face groove having a width and said rear face groove having a width, said first front face groove width is less than said rear face groove width.

15. The bearing according to claim 14, wherein said second front face groove having a width, said rear face groove width is less than said second front face groove width.

16. The bearing according to claim 14, wherein said second front face groove having a width, said second front face groove width is less than said rear face groove width.

17. A bearing in an electrostatographic machine comprising:
    an elongated body including an outer surface and an inner bore including a center axis therethrough;
    said body having a front face and a rear face, said front face having at least one circumferential groove including a first distance from said center axis and said rear face having at least one circumferential groove including a second distance from said center axis wherein said first distance is less than said second distance;
    said front face groove having a width and said rear face groove having a width; and,
    said front face groove width is different from said rear face groove width.

18. The bearing according to claim 17, wherein said outer surface includes an edge having a fillet therearound.

19. The bearing according to claim 17, wherein said inner bore includes an edge having a fillet therearound.

20. The bearing according to claim 19, wherein at least one of said outer surface edge and said inner bore edge includes a chamfer therearound.

21. A bearing in an electrostatographic machine comprising:
    an elongated body including an outer surface and an inner bore;
    said body having a front face and a rear face, said front face having at least one circumferential groove and said rear face having at least one circumferential groove;
    said front face groove having a width and said rear face groove having a width;
    said front face groove width tapers from said front face to said rear face;
    said inner bore and said front face groove defining a first wall having a thickness;
    said front face groove and said rear face groove defining a second wall having a thickness;
    said rear face groove and said outer surface defining a third wall having a thickness;
    said first wall, said second wall, and said third wall forming a pair of crenulations therebetween; and,
    said first wall thickness is greater than said second wall thickness.

22. A bearing in an electrostatographic machine comprising:
- an elongated body including an outer surface and an inner bore;
- said body having a front face and a rear face, said front face having at least one circumferential groove and said rear face having at least one circumferential groove;
- said front face groove having a width and said rear face groove having a width;
- said front face groove width tapers from said front face to said rear face;
- said front face including a second circumferential groove having a width, said second groove width narrows from said front face to said rear face.

23. A bearing in an electrostatographic machine comprising:
- an elongated body including an outer surface and an inner bore;
- said body having a front face and a rear face, said front face having at least one circumferential groove and said rear face having at least one circumferential groove;
- said front face groove having a width and said rear face groove having a width;
- said front face groove width tapers from said front face to said rear face;
- said rear face including a second circumferential groove having a width, said second groove width narrows from said rear face to said front face.

24. A bearing comprising:
- an elongated body including an outer surface and an inner bore;
- said body having a front face and a rear face, said front face having at least a first circumferential groove and said rear face having at least a second circumferential groove;
- said front face first groove having a width and said rear face second groove having a width; and,
- at least one of said front face and said rear face having at least a third circumferential groove wherein at least one of said groove widths is different from at least another groove width.

* * * * *